US012728920B2

(12) United States Patent
Sakaguchi et al.

(10) Patent No.: US 12,728,920 B2
(45) Date of Patent: Sep. 8, 2026

(54) DRIVING ASSISTANCE DEVICE

(71) Applicant: Hitachi Astemo, Ltd., Hitachinaka (JP)

(72) Inventors: Tomoyasu Sakaguchi, Tokyo (JP); Masashi Seimiya, Tokyo (JP); Keisuke Takeuchi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 137 days.

(21) Appl. No.: 18/007,519

(22) PCT Filed: Feb. 26, 2021

(86) PCT No.: PCT/JP2021/007431
§ 371 (c)(1),
(2) Date: Dec. 1, 2022

(87) PCT Pub. No.: WO2022/024430
PCT Pub. Date: Feb. 3, 2022

(65) Prior Publication Data

US 2023/0211824 A1 Jul. 6, 2023

(30) Foreign Application Priority Data

Jul. 28, 2020 (JP) ................................ 2020-127228

(51) Int. Cl.
*B62D 15/02* (2006.01)
*B60W 10/20* (2006.01)
(Continued)

(52) U.S. Cl.
CPC ......... *B62D 15/0265* (2013.01); *B60W 10/20* (2013.01); *B60W 30/0956* (2013.01);
(Continued)

(58) Field of Classification Search
None
See application file for complete search history.

(56) References Cited

U.S. PATENT DOCUMENTS 6,057,754 A * 5/2000 Kinoshita ................ B62D 1/28 348/148
8,626,431 B2 * 1/2014 Okita .................... B60W 30/09 701/301

(Continued)

FOREIGN PATENT DOCUMENTS

JP 11-66494 A 3/1999
JP 2002-104112 A 4/2002

(Continued)

OTHER PUBLICATIONS

International Search Report (PCT/ISA/210) issued in PCT Application No. PCT/JP2021/007431 dated May 18, 2021 with English translation (seven (7) pages).

(Continued)

*Primary Examiner* — Kevin R Steckbauer
(74) *Attorney, Agent, or Firm* — Crowell & Moring LLP

(57) ABSTRACT

A driving assistance device that includes a processor and a memory and assists driving of a vehicle includes: an external environment information acquisition unit that acquires external environment information of the vehicle; an obstacle detection unit that detects an obstacle in front of the vehicle from the external environment information; a lane detection unit that detects a lane boundary line and a road edge from the external environment information; an alarm unit that issues an alarm or performs steering assist when deviation from the lane boundary line or the road edge is detected; and a state management unit that suppresses the alarm or the steering assist when the obstacle detection unit detects the obstacle.

9 Claims, 8 Drawing Sheets

(51) Int. Cl.

| | |
|---|---|
| ***B60W 30/095*** | (2012.01) |
| ***B60W 30/12*** | (2020.01) |
| ***B60W 50/00*** | (2006.01) |
| ***B60W 50/14*** | (2020.01) |
| ***G08G 1/16*** | (2006.01) |

(52) U.S. Cl.

CPC ............ *B60W 30/12* (2013.01); *B60W 50/14* (2013.01); *B62D 15/029* (2013.01); *G08G 1/165* (2013.01); *G08G 1/167* (2013.01); *B60R 2300/804* (2013.01); *B60R 2300/8086* (2013.01); *B60R 2300/8093* (2013.01); *B60W 2050/009* (2013.01); *B60W 2552/53* (2020.02); *B60W 2554/40* (2020.02)

(56) References Cited

U.S. PATENT DOCUMENTS

| | | | | |
|---|---|---|---|---|
| 9,352,774 | B2 * | 5/2016 | Ueda | B62D 6/00 |
| 9,522,700 | B2 * | 12/2016 | Yamaoka | B62D 15/0255 |
| 9,764,735 | B2 * | 9/2017 | Silvlin | B62D 15/025 |
| 10,262,534 | B2 * | 4/2019 | Okada | G08G 1/164 |
| 10,919,525 | B2 * | 2/2021 | Cheon | B60W 30/18163 |
| 11,305,788 | B2 * | 4/2022 | Eguchi | B60W 30/18163 |
| 11,731,701 | B2 * | 8/2023 | Igarashi | B62D 15/0255 701/23 |
| 11,733,708 | B2 * | 8/2023 | Kawanai | G05D 1/0038 701/27 |
| 12,214,784 | B2 * | 2/2025 | Komoguchi | B60W 30/12 |
| 2004/0249535 | A1 | 12/2004 | Maass et al. | |
| 2011/0022317 | A1 * | 1/2011 | Okita | B60W 30/09 701/301 |
| 2013/0238194 | A1 * | 9/2013 | Ueda | B62D 15/025 701/41 |
| 2015/0344029 | A1 * | 12/2015 | Silvlin | B60W 30/08 701/36 |
| 2016/0107687 | A1 * | 4/2016 | Yamaoka | B62D 15/025 701/41 |
| 2016/0335892 | A1 * | 11/2016 | Okada | G08G 1/164 |
| 2017/0148327 | A1 | 5/2017 | Sim | |
| 2017/0166254 | A1 | 6/2017 | Katoh | |
| 2018/0105152 | A1 * | 4/2018 | Nagae | G08G 1/165 |
| 2019/0080611 | A1 | 3/2019 | Yamada et al. | |
| 2020/0385021 | A1 * | 12/2020 | Eguchi | B60W 30/12 |
| 2020/0385023 | A1 * | 12/2020 | Eguchi | B60W 60/0025 |
| 2020/0391731 | A1 * | 12/2020 | Cheon | B60W 10/18 |
| 2021/0055741 | A1 * | 2/2021 | Kawanai | G08G 1/167 |
| 2021/0080943 | A1 * | 3/2021 | Iwamoto | G01C 21/3407 |
| 2021/0086768 | A1 * | 3/2021 | Komoguchi | B60W 30/12 |
| 2022/0314976 | A1 * | 10/2022 | Yasui | B60W 30/18163 |
| 2022/0314977 | A1 * | 10/2022 | Yasui | B60W 10/18 |
| 2022/0314978 | A1 * | 10/2022 | Yasui | B60W 50/16 |
| 2022/0314985 | A1 * | 10/2022 | Yasui | B62D 15/025 |
| 2023/0023751 | A1 * | 1/2023 | Itazuri | B60W 30/12 |
| 2023/0029842 | A1 * | 2/2023 | Okano | B60W 30/12 |
| 2023/0054263 | A1 * | 2/2023 | Lin | B60W 30/18163 |
| 2023/0128391 | A1 * | 4/2023 | Ichinokawa | B60W 40/02 701/301 |
| 2023/0133757 | A1 * | 5/2023 | Igarashi | B62D 15/0255 701/23 |
| 2023/0211824 | A1 * | 7/2023 | Sakaguchi | B62D 15/0265 701/41 |
| 2024/0067267 | A1 * | 2/2024 | Uchida | B60Q 9/00 |
| 2024/0190419 | A1 * | 6/2024 | Kim | B60W 30/09 |

FOREIGN PATENT DOCUMENTS

| | | | | |
|---|---|---|---|---|
| JP | 2007-8281 | A | 1/2007 | |
| JP | 2008-120288 | A | 5/2008 | |
| JP | 2015-209129 | A | 11/2015 | |
| JP | 2017-105383 | A | 6/2017 | |
| JP | 2018-90006 | A | 6/2018 | |
| JP | 2019-49810 | A | 3/2019 | |
| JP | 2019-197399 | A | 11/2019 | |
| JP | 2019-209837 | A | 12/2019 | |
| WO | WO-2022024430 | A1 * | 2/2022 | G08G 1/167 |

OTHER PUBLICATIONS

Japanese-language Written Opinion (PCT/ISA/237) issued in PCT Application No. PCT/JP2021/007431 dated May 18, 2021 (four (4) pages).

* cited by examiner

START

S1 PROCESSING OF ACQUIRING EXTERNAL ENVIRONMENT INFORMATION

S2 PROCESSING OF DETERMINING POSITION OF OBSTACLE

S3 PROCESSING OF DETERMINING AVOIDANCE OF OBSTACLE

S4 PROCESSING OF MANAGING STATE

S5 EXECUTION OF DEVIATION PREVENTION FUNCTION

END

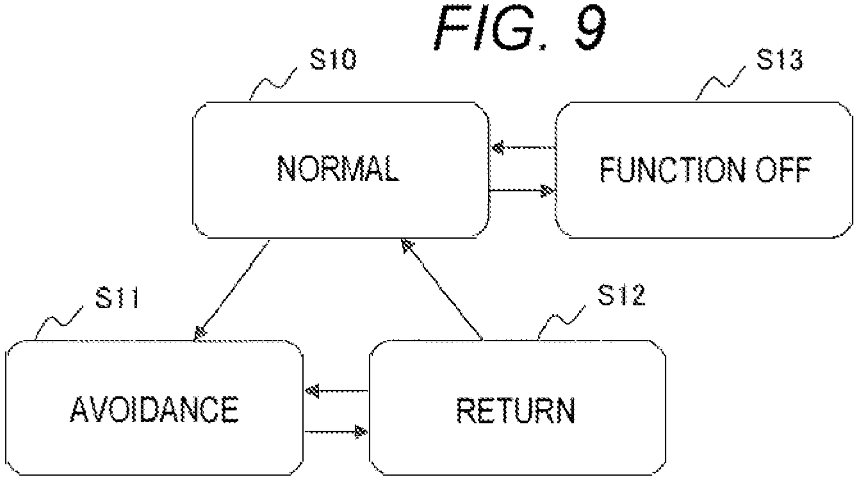

FIG. 9

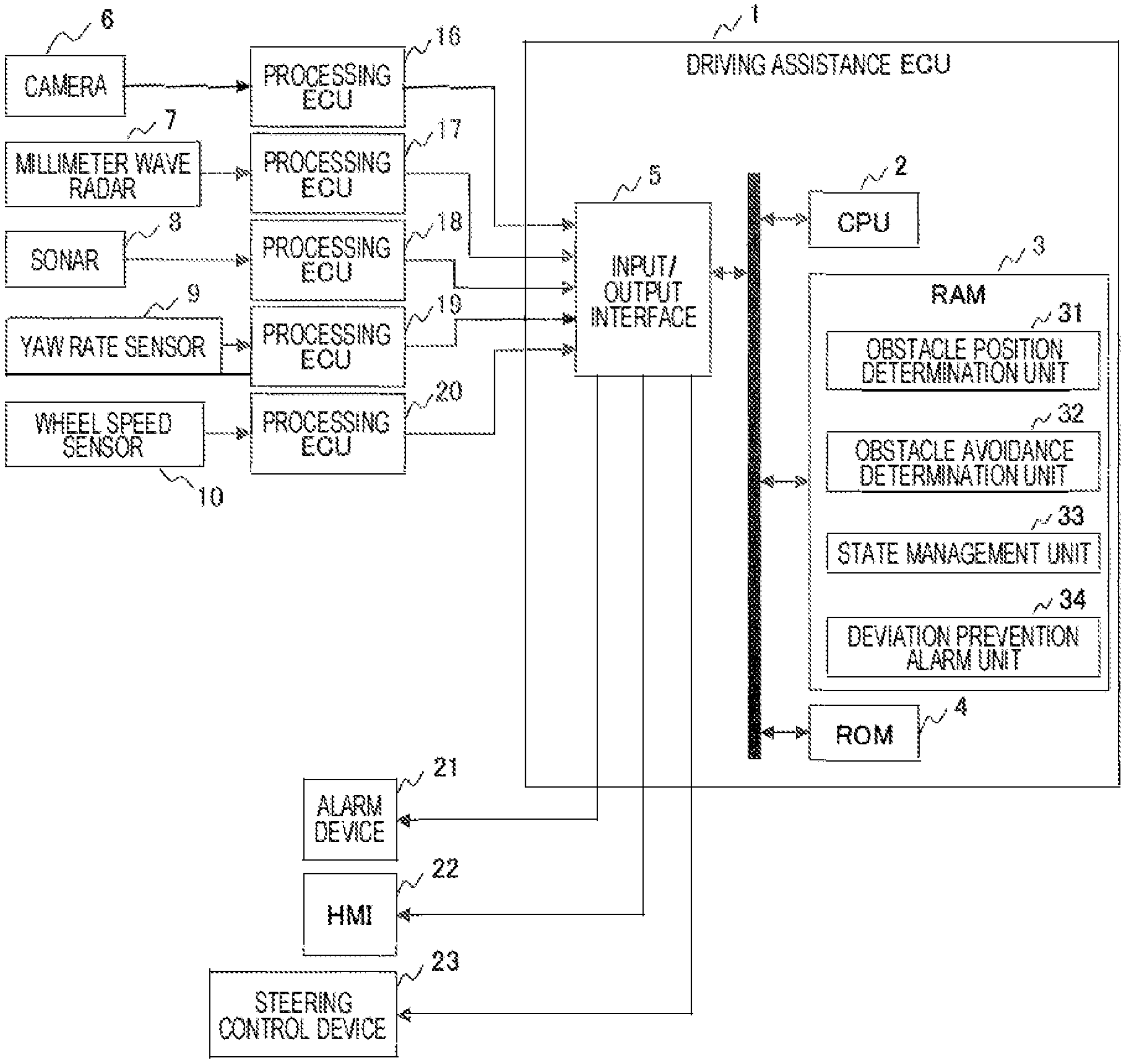

FIG. 10

6
CAMERA
7
MILLIMETER WAVE RADAR
8
SONAR
9
YAW RATE SENSOR
WHEEL SPEED SENSOR
10
16
PROCESSING ECU
17
PROCESSING ECU
18
PROCESSING ECU
19
PROCESSING ECU
20
PROCESSING ECU
1
DRIVING ASSISTANCE ECU
5
INPUT/ OUTPUT INTERFACE
2
CPU
3
RAM
31
OBSTACLE POSITION DETERMINATION UNIT
32
OBSTACLE AVOIDANCE DETERMINATION UNIT
33
STATE MANAGEMENT UNIT
34
DEVIATION PREVENTION ALARM UNIT
4
ROM
21
ALARM DEVICE
22
HMI
23
STEERING CONTROL DEVICE

DRIVING ASSISTANCE DEVICE

INCORPORATION BY REFERENCE

This application claims priority to Japanese Patent Application No. 2020-127228 filed on Jul. 28, 2020 (2020), the contents of which are incorporated herein by reference.

TECHNICAL FIELD

The present invention relates to a vehicle driving assistance technology.

BACKGROUND ART

As one of vehicle driving assistance functions, a function called a lane deviation alarm function is known. In this configuration, a sensor such as a camera recognizes a boundary line on a road while a vehicle is traveling, and when a situation in which the vehicle deviates from the boundary line due to driver's driving or in which the deviation is expected is detected, the driver is prompted to perform a deviation avoidance operation by an alarm sound or intervention in a steering wheel operation.

When an obstacle is found in front of the vehicle while the vehicle is traveling in a lane, or when the driver indicates an intention to change the lane, measures are often taken such as canceling this function and not hindering the driver from changing the lane.

In addition, when a right/left turning vehicle stopped at one side of a lane is found in front, there is a case where the driver wants to pass by crossing a boundary line while avoiding it sideways. In this case, the lane deviation alarm function often either warn of deviation or is canceled.

PTL 1 discloses a driving assistance control device that assists driving to position an own vehicle closer to a road edge when the own vehicle travels following a preceding vehicle and when the own vehicle is present near an intersection. When a lane width is sufficient, the vehicle avoids a right-turning vehicle, cancels lane keeping assistance using a lane edge, and travels close to the road edge beyond the lane edge.

PTL 2 discloses a route determination device that keeps a lane in a state where there is no obstacle ahead, and causes a vehicle to travel in a free space following a vehicle ahead if the free space is present on a road shoulder when an obstacle is detected.

PTL 3 discloses a steering control device that changes travel control of lane keeping control to a direction in which it is easy to stop when a driver's intention to perform a steering operation to avoid an obstacle is detected, and changes a control characteristic to a direction in which an operation of lane deviation prevention control is enhanced when deviation of an own vehicle from a destination lane to the outside is expected at the time of the completion of the steering operation to avoid the obstacle.

CITATION LIST

Patent Literature

PTL 1: JP 2019-209837 A

PTL 2: JP 2019-197399 A

PTL 3: JP 2015-209129 A

SUMMARY OF INVENTION

Technical Problem

However, when the vehicle deviates from the lane due to a driver's driving operation, if the lane deviation prevention function is canceled or an alarm for lane deviation continues, the driver does not notice the approach to a physical edge of the road, that is, the road edge, and there is a risk of collision or going off the road edge due to deviation.

Therefore, the present invention has been made in view of the above problems, and an object of the present invention is to continue driving assistance for preventing deviation from a road edge without preventing deviation from a lane as intended by a driver.

Solution to Problem

The present invention is a driving assistance device that includes a processor and a memory and assists driving of a vehicle, and includes: an external environment information acquisition unit that acquires external environment information of the vehicle; an obstacle detection unit that detects an obstacle in front of the vehicle from the external environment information; a lane detection unit that detects a lane boundary line and a road edge from the external environment information; an alarm unit that issues an alarm or performs steering assist when deviation from the lane boundary line or the road edge is detected; and a state management unit that suppresses the alarm or the steering assist when the obstacle detection unit detects the obstacle.

Advantageous Effects of Invention

Therefore, the present invention can prevent deviation from a road (road edge) without preventing deviation from a lane as intended by a driver.

Details of at least one implementation of the subject matter disclosed herein are set forth in the accompanying drawings and the following description. Other features, aspects, and effects of the disclosed subject matter will be apparent from the following disclosure, drawings, and claims.

BRIEF DESCRIPTION OF DRAWINGS

FIG. 9 illustrates Example 1 of the present invention and illustrates a state transition diagram of a driving assistance system.

FIG. 10 is a block diagram illustrating Example 1 of the present invention and illustrating an example of a configuration of the driving assistance system.

DESCRIPTION OF EMBODIMENTS

Figure 1:
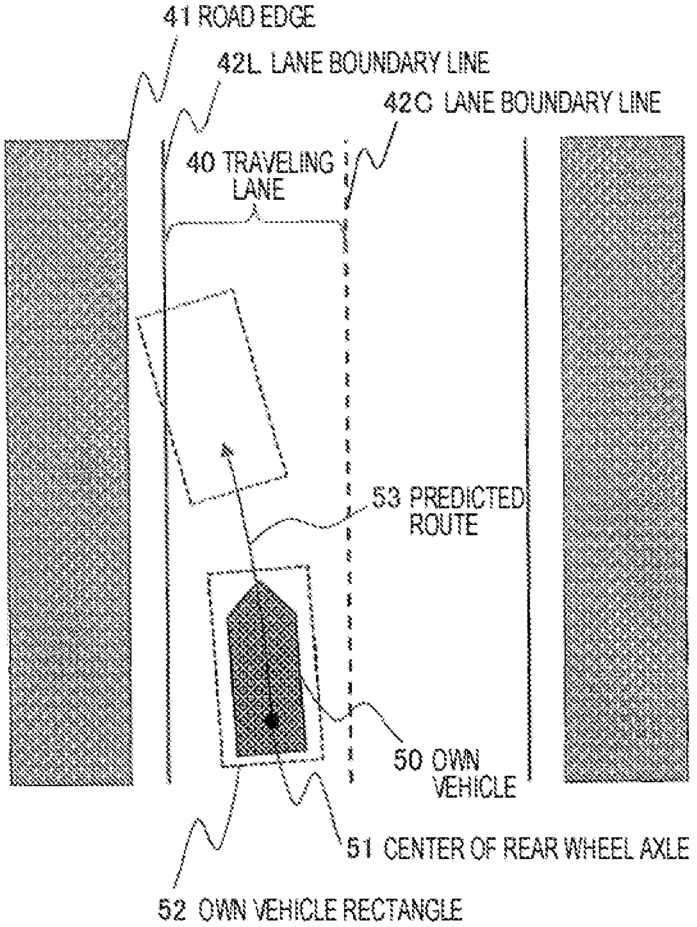
FIG. 1 is a diagram illustrating Example 1 of the present invention and illustrating an example of a lane deviation prevention alarm function.

Hereinafter, Examples of the present invention will be described with reference to the drawings. Note that, in each drawing, members or elements having the same effects or functions are denoted by the same reference numerals, and redundant description is appropriately omitted.

Example 1

FIG. 10 is a diagram illustrating an example of a configuration of a driving assistance system. The driving assistance system includes a sensor that detects an environment outside a vehicle and a traveling state of the vehicle, processing electronic control units (ECUs) that process output from each of sensors, a driving assistance ECU 1 that assists driving on the basis of a processing result of each processing ECU, and a device that is controlled by the driving assistance ECU 1.

The sensors include a camera 6 that acquires front and side image information, a millimeter wave radar 7 that detects a side obstacle, a sonar 8 that detects a side obstacle, a yaw rate sensor 9 that detects a yaw rate around a vertical axis of the vehicle, and a wheel speed sensor 10 that detects a rotation speed of a wheel.

The camera 6 includes a camera that monitors the front and a camera that monitors the side, and image information acquired by the camera 6 is subjected to predetermined image processing by the processing ECU 16 and input to the driving assistance ECU 1.

Information on the obstacle detected by the millimeter wave radar 7 is subjected to predetermined distance measurement processing by the processing ECU 17 and output to the driving assistance ECU 1. Information on the obstacle detected by the sonar 8 is subjected to predetermined distance measurement processing by the processing ECU 18 and output to the driving assistance ECU 1.

The yaw rate detected by the yaw rate sensor 9 is subjected to predetermined angular velocity processing by the processing ECU 19 and is output to the driving assistance ECU 1. The wheel speed detected by the wheel speed sensor 10 is subjected to predetermined vehicle speed processing by the processing ECU 20 and output to the driving assistance ECU 1.

The driving assistance ECU 1 is a computer including a central processing unit (CPU) 2, a random access memory (RAM) 3, a read only memory (ROM) 4, and an input/output interface 5.

In the RAM 3, an obstacle position determination unit 31, an obstacle avoidance determination unit 32, a state management unit 33, and a deviation prevention alarm unit 34 are loaded as programs and executed by the CPU 2.

The CPU 2 operates as a functional unit that provides a predetermined function by executing processing in accordance with the programs of each functional unit. For example, the CPU 2 functions as the obstacle position determination unit 31 by executing processing in accordance with an obstacle position determination program. The same applies to the other programs. Further, the CPU 2 also operates as a functional unit that provides a function of each of a plurality of processes executed by each program. The computer and the computer system are a device and a system including these functional units.

The driving assistance ECU 1 includes functional units of the obstacle position determination unit 31, the obstacle avoidance determination unit 32, the state management unit 33, and the deviation prevention alarm unit 34. The deviation prevention alarm unit 34 of the present Example includes a lane deviation prevention alarm unit that prevents the own vehicle from deviating from a lane boundary line and a road edge deviation prevention alarm unit that prevents the own vehicle from deviating (or approaching) from a road edge.

An alarm device 21, a human machine interface (HMI) 22, and a steering control device 23 are connected to the driving assistance ECU 1 as devices to be controlled. The alarm device 21 notifies a driver of an alarm by voice or the like.

The HMI 22 includes an input/output device such as a display, a touch panel, a button, or a switch, visually notifies the driver of an alarm or a state of the system, and receives an input by a button operation or a touch operation from the driver.

The steering control device 23 assists the steering operation of the driver, and outputs an alarm to the driver by changing the assistance force or applying a reaction force. Although not illustrated, a control ECU for driving force and braking force is mounted on the vehicle.

The camera 6 captures an image in a vehicle traveling direction with the front camera, and detects a lane boundary line in front of the vehicle, a physical edge (road edge) of a road, an obstacle, and the like as image information. In addition, the camera 6 includes a side camera that monitors the side of the vehicle.

The processing ECU 16 connected to the camera 6 recognizes the lane boundary line, the road edge, and the obstacle from the image information, and outputs the recognition results to the driving assistance ECU 1. The driving assistance ECU 1 receives the recognition results from the processing ECU 16 functioning as a lane detection unit, and performs processing of acquiring external environment information.

The millimeter wave radar 7 and the sonar 8 are mounted to be oriented toward the side of the vehicle, and the processing ECUs 17 and 18 detect an obstacle and measure the distance of the obstacle from distance measurement information detected by the millimeter wave radar 7 and the sonar 8. The driving assistance ECU 1 performs processing from processing of determining the position of an obstacle to the execution of the deviation prevention function as described later.

FIG. 1 is a diagram illustrating an example of a function of the lane deviation prevention alarm unit constituting the deviation prevention alarm unit 34.

The lane deviation prevention alarm unit constituting the deviation prevention alarm unit 34 of the driving assistance ECU 1 detects relative positions between the own vehicle 50 and lane boundary lines 42L and 42C by recognizing the left and right lane boundary lines 42L and 42C based on the image of the camera 6 or the like, detects that the own vehicle 50 has deviated from a traveling lane 40, or determines the possibility of lane deviation from a predicted route 53 of the own vehicle 50, and operates a lane deviation alarm.

Note that, in the present Example, the traveling lane 40 is defined as a lane between the lane boundary lines 42L and 42C. The deviation of the own vehicle 50 from the traveling lane 40 is defined as lane deviation.

For example, the driving assistance ECU 1 recognizes the left and right lane boundary lines 42L and 42C from the image of the camera 6, and converts each of the lane boundary lines into relative coordinate representation. In the driving assistance ECU 1, the relative coordinate representation indicates the latest state of the relative positions between the own vehicle 50 and the lane boundary lines 42.

On the other hand, the driving assistance ECU 1 calculates, from the vehicle speed, the yaw rate, and the steering angle of the own vehicle 50, the predicted route 53 that the center 51 of the rear wheel axle of the own vehicle 50 reaches after traveling for a certain time or a certain distance, and further calculates predicted positions of four vertices of a rectangle (referred to as an own vehicle rectangle 52) into which the own vehicle 50 completely enters as illustrated in the drawing.

Then, when the four vertices deviate from the lane boundary lines 42L and 42C, the driving assistance ECU 1 determines that there is a possibility of the lane deviation and causes the alarm device 21 or the steering control device 23 to output an alarm. As the type of the alarm, for example, alarm sounding, an alarm sound, vibration of the steering wheel, a change in steering assist force, steering reaction force, a change in screen display of the HMI 22, and the like can be performed.

The road edge deviation prevention alarm unit that prevents collision with a road edge 41 and deviation from the road edge 41 is basically similar to the lane deviation prevention alarm unit, and uses the road edge 41 instead of the lane boundary line 42L. However, the road edge deviation prevention alarm unit issues an alarm even when the vehicle approaches within a predetermined distance from the road edge 41.

The deviation of the own vehicle 50 may cause a quick collision at the road edge 41 or cause the own vehicle 50 to go off the road edge 41. Therefore, it is conceivable to output an alarm when the own vehicle approaches the road edge 41. In order to detect the approach to the road edge 41, the driving assistance ECU 1 enlarges and uses the size of the own vehicle rectangle 52, for example.

When the driving assistance ECU 1 can use height information of the road edge 41, a method of determining the type of the road edge based on the height information of the road edge 41 and changing the size of the own vehicle rectangle 52 according to the type of the road edge can be considered. For example, the driving assistance ECU 1 changes the size of the own vehicle rectangle 52 when the road edge 41 is a curbstone and a tunnel wall.

When the driving assistance ECU 1 cannot detect the road edge 41 or the lane boundary line 42L, or when the road edge 41 and the lane boundary line 42L are close to each other depending on the road, the lane deviation prevention alarm unit and the road edge deviation prevention alarm unit perform arbitration so as not to conflict with each other.

For example, there is considered an arbitration method in which the driving assistance ECU 1 enables only a road deviation prevention alarm unit for a line (the road edge or the lane boundary line) that has been detected when either of them has not been detected, and prioritizes the road edge deviation prevention alarm unit when the road edge deviation prevention alarm unit meets an issuing condition before the lane deviation prevention alarm unit.

Figure 2:
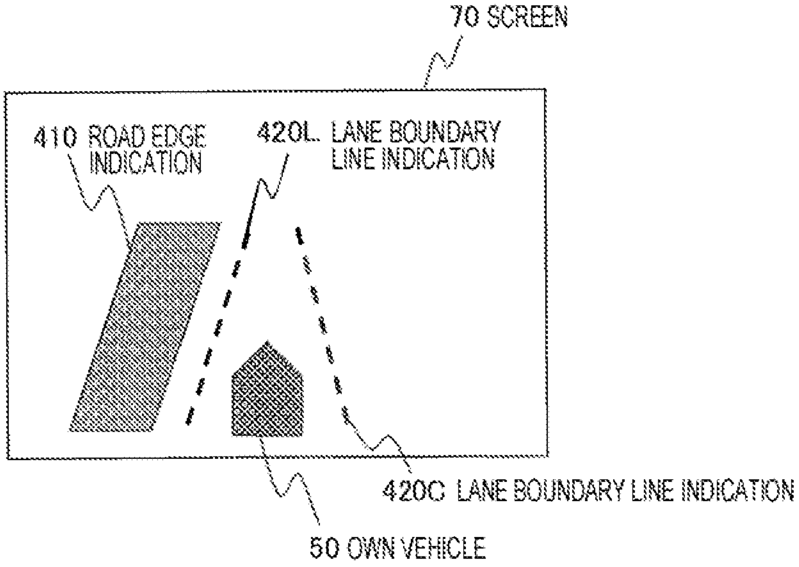
FIG. 2 is a diagram illustrating Example 1 of the present invention and illustrating an example of screen display of an HMI.

FIG. 2 is a diagram illustrating an example of screen display of the HMI 22.

Lane boundary line indications 420L and 420C indicating that the lane boundary lines 42L and 42C are recognized and a road edge indication 410 indicating that the road edge 41 is recognized are displayed on a screen 70 of the HMI 22.

It is possible to notify the driver of whether or not the lane boundary lines 42L and 42C and the road edge 41 have been recognized and the operation status of the deviation prevention alarm unit 34 for each of the lane boundary lines and the road edge depending on how each of the lane boundary line indications 420L and 420C and the road edge indication 410 is displayed.

For example, the driving assistance ECU 1 displays the lane boundary line indications 420L and 420C with white solid lines when the lane boundary lines 42L and 42C are recognized, and displays the lane boundary line indications 420L and 420C with blue solid lines when the lane deviation prevention alarm unit is enabled.

The same applies to the road edge 41. When the driving assistance ECU 1 can recognize the road edge 41, the road edge indication 410 is displayed as a white graphic, and when the road edge deviation prevention alarm unit is enabled, the road edge indication 410 is displayed as a blue graphic.

Figure 3:
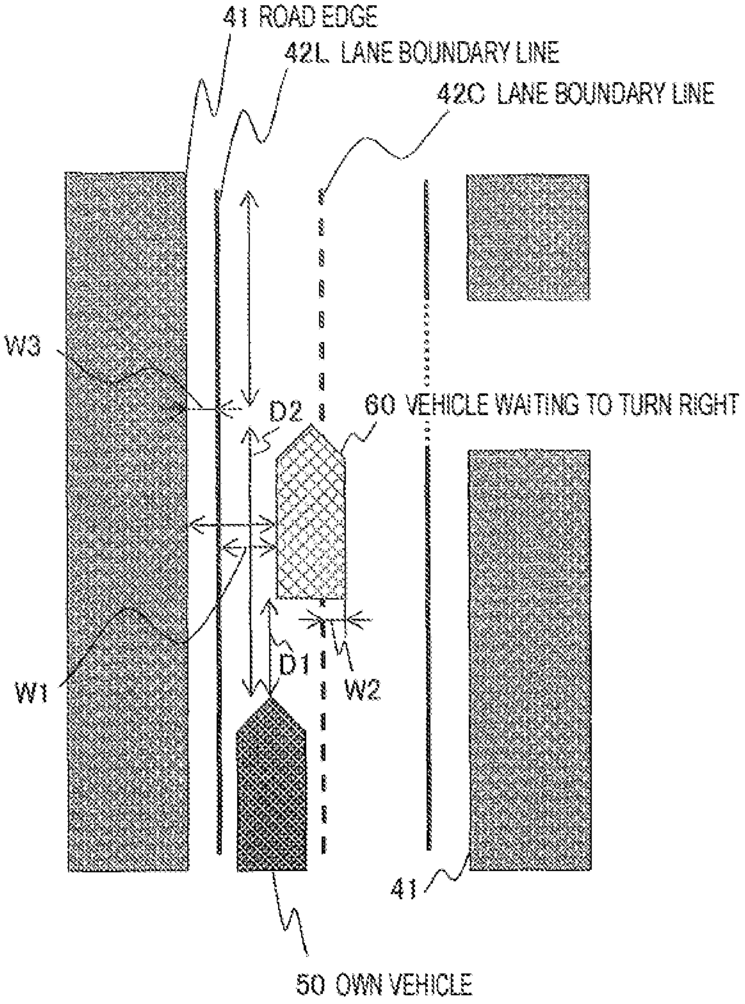
FIG. 3 is a diagram illustrating Example 1 of the present invention and illustrating a situation where a vehicle waiting to turn right is present ahead of an own vehicle.

FIG. 3 is a diagram illustrating a situation where a vehicle 60 waiting to turn right is present ahead of the own vehicle 50.

This is a situation in which the own vehicle 50 is traveling on a road with one lane on each side, and the vehicle 60 waiting to turn right is being stopped in front. The vehicle 60 waiting to turn right is closer to the center (42C) of the road, and the own vehicle 50 cannot avoid the vehicle 60 waiting to turn right by changing the lane, but there is a possibility that the own vehicle 50 can avoid the vehicle 60 waiting to turn right by using a space (shoulder) between the vehicle 60 waiting to turn right and the road edge 41.

At the time immediately before the vehicle 60 waiting to turn right is detected, in the own vehicle 50, the lane boundary lines 42L and 42C and the road edge 41 are detected from the image of the front camera 6, and the lane deviation prevention alarm unit and the road edge deviation prevention alarm unit are operated for each of them.

In this case, when the driver performs a driving operation for the avoidance, the driver may request the following assistance to the driving assistance function.

(1) Since the driver himself/herself intentionally deviates from the lane boundary line 42L or performs a driving operation that may cause deviation, it is desirable to suppress a deviation prevention alarm for the traveling lane 40.

(2) When the vehicle approaches too close to the road edge 41, it is desirable to issue a deviation prevention alarm for the road edge.

Here, the deviation prevention alarm unit 34 of the driving assistance ECU 1 assists driving as follows.

(3) When detecting an obstacle ahead, the driving assistance ECU 1 determines the possibility that the driver will perform a lane deviation operation to avoid the obstacle from the position of the obstacle.

(4) When determining that there is a possibility of the lane deviation operation to avoid the obstacle, the driving assistance ECU 1 suppresses the level of the alarm of the lane deviation prevention alarm unit.

(5) On the other hand, the driving assistance ECU 1 maintains the road edge deviation prevention alarm unit.

In this case, the driving assistance ECU 1 can control the deviation prevention alarm unit as follows.

The driving assistance ECU 1 may bring the deviation prevention alarm unit into the non-operating state for the traveling lane 40 and bring the deviation prevention alarm unit from the non-operating state into the operating state for the road edge 41.

When the distance between the road edge 41 and the obstacle is short, changing the lane is required instead of the lane deviation, and thus the driving assistance ECU 1 may determine not to perform such a change.

The change may not be performed when the driving assistance ECU 1 cannot determine safety, such as when an obstacle is present in a space (roadside zone) between the lane boundary line 42L and the road edge 41.

Figure 4A:
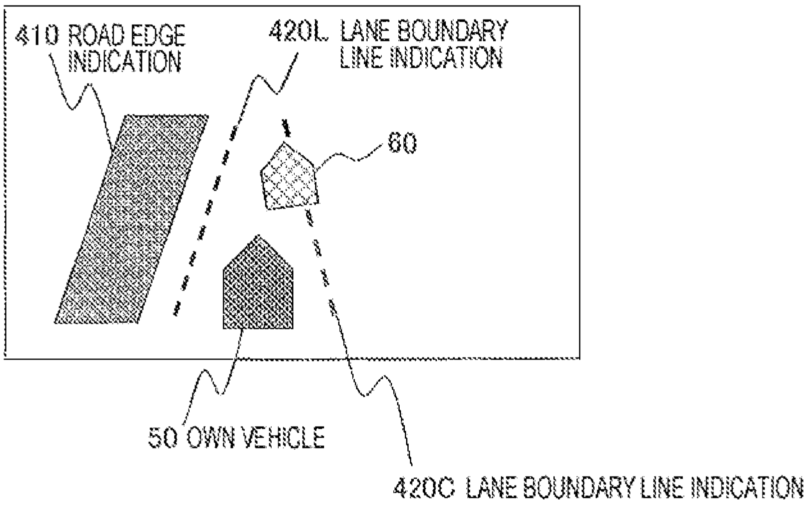
FIG. 4A is a diagram illustrating Example 1 of the present invention and illustrating an example of screen display of the HMI immediately before avoidance of the right-turning vehicle.
Figure 4B:
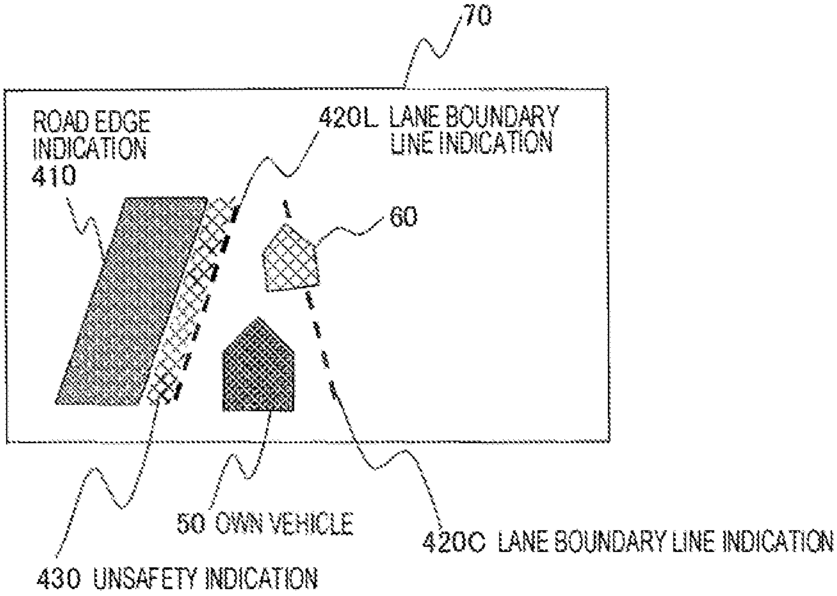
FIG. 4B is a diagram illustrating Example 1 of the present invention and illustrating an example of screen display of the HMI immediately before the avoidance of the right-turning vehicle when an obstacle or the like between a lane boundary line and a road edge is detected.

FIG. 4A is a diagram illustrating an example of screen display of the HMI 22 immediately before the avoidance of the right-turning vehicle. FIG. 4B is a diagram illustrating an example of screen display when an obstacle or the like between the lane boundary line 42L and the road edge 41 is detected.

In FIG. 4A, the obstacle is displayed on the lane boundary line indication 420C on the right side of the own vehicle 50 on the screen 70 of the HMI 22. This indicates a state in which the vehicle 60 waiting to turn right or the obstacle blocks the right side of the lane, and at the same time, indicates that the alarm level is lowered by making the display of the lane boundary line indication 420L on the left side light or the like.

As a result, the driver can perform an operation of avoiding the vehicle 60 waiting to turn right without worrying about an alarm from the driving assistance system. In addition, since the road edge indication 410 does not change on the screen 70, the driver can know that the deviation prevention alarm unit is kept enabled for the road edge 41.

In FIG. 4B, an unsafety indication 430 in which the display between the lane boundary line indication 420L and the road edge 41 is changed is displayed on the screen 70 of the HMI 22. This indicates that it is not safe to travel between the lane boundary line 42L and the road edge 41 since an obstacle or the like between the lane boundary line indication 420L and the road edge indication 410 is detected.

In this case, the driving assistance ECU 1 maintains the alarm level of the lane deviation prevention alarm unit or increases the alarm level. When increasing the alarm level, the driving assistance ECU 1 changes the unsafety indication 430 between the lane boundary line 42L and the road edge 41.

Figure 5:
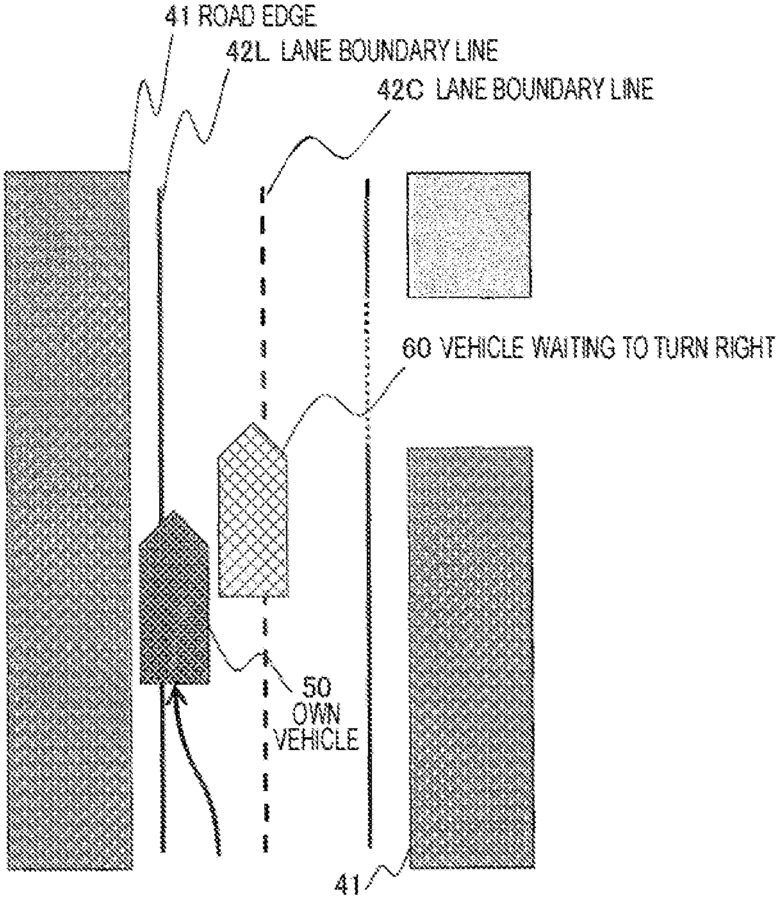
FIG. 5 is a diagram illustrating Example 1 of the present invention and illustrating a situation where the own vehicle is avoiding the vehicle waiting to turn right.

FIG. 5 is a diagram illustrating a situation where the own vehicle 50 is avoiding the vehicle 60 waiting to turn right.

The own vehicle 50 deviates from the lane boundary line 42L in order to avoid the vehicle 60 waiting to turn right, but maintains an appropriate distance from the road edge 41. The deviation prevention alarm unit 34 of the driving assistance ECU 1 issues a suppressed alarm indicating that the own vehicle 50 is deviating from the lane in order to avoid the obstacle, or issues no alarm. On the screen of the HMI 22, an indication indicating that the own vehicle 50 deviates from the lane boundary line 42L and is traveling is displayed.

The driving assistance ECU 1 determines that the own vehicle 50 has completed the avoidance of the vehicle 60 waiting to turn right in the following procedure.

First, the driving assistance ECU 1 determines whether a side obstacle has been detected by the various sensors that monitor the side of the own vehicle 50 and are the sonar 8, the camera 6, and the millimeter wave radar 7.

The driving assistance ECU 1 determines that the own vehicle 50 has passed the side of the vehicle 60 waiting to turn right based on the recognition of the position of the obstacle and the depth of the obstacle by the camera 6 monitoring the front and the count of the travel distance of the own vehicle 50.

The driving assistance ECU 1 can determine that the avoidance of the vehicle 60 waiting to turn right has been completed based on the condition that there is no side obstacle and the travel distance of the vehicle passing the distance of the obstacle in the depth direction.

Figure 6:
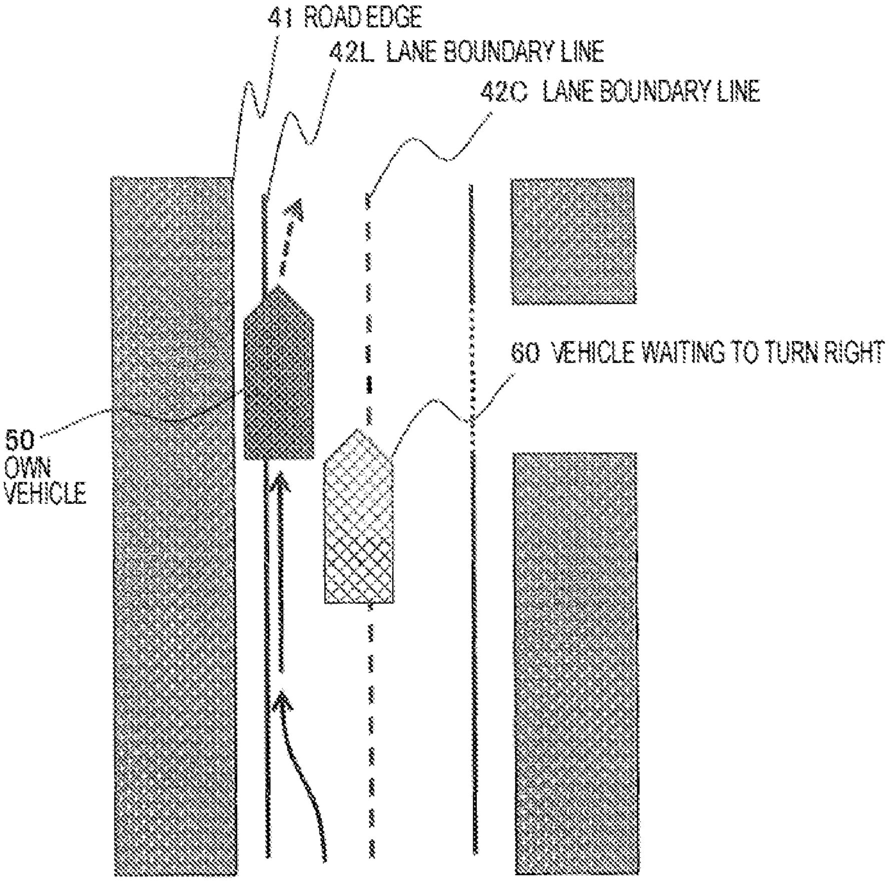
FIG. 6 is a diagram illustrating Example 1 of the present invention and illustrating a situation where the avoidance has been completed by passing by the vehicle waiting to turn right.

FIG. 6 is a diagram illustrating a situation in which the own vehicle 50 has passed the side of the vehicle 60 waiting to turn right and the avoidance has been completed.

In the driving assistance ECU 1, when the own vehicle 50 has completed the avoidance of the vehicle 60 waiting to turn right, the deviation prevention alarm unit 34 issues an alarm indicating that the avoidance has been completed and that the vehicle is deviating from the lane, or does not issue any alarm. On the screen of the HMI 22, the indication indicating that the own vehicle 50 deviates from the lane and is traveling is output, but the display of the obstacle has already disappeared.

Then, the driving assistance ECU 1 notifies that the alarm level of the lane deviation prevention alarm unit will return to the original level after a while by blinking or the like in the screen 70 of the HMI 22. When the own vehicle 50 travels a certain distance (or a certain time) after the completion of the avoidance of the vehicle 60, the driving assistance ECU 1 returns the lane deviation alarm function to the original alarm level.

The driving assistance ECU 1 issues a lane deviation alarm when the own vehicle 50 deviates from the lane boundary line 42L (or 42C) after traveling a certain distance. On the other hand, when the own vehicle 50 returns from the lane deviation state after traveling a certain distance, the driving assistance ECU 1 returns the alarm level of the lane deviation alarm function to the original level from the time of the return.

Figure 7A:
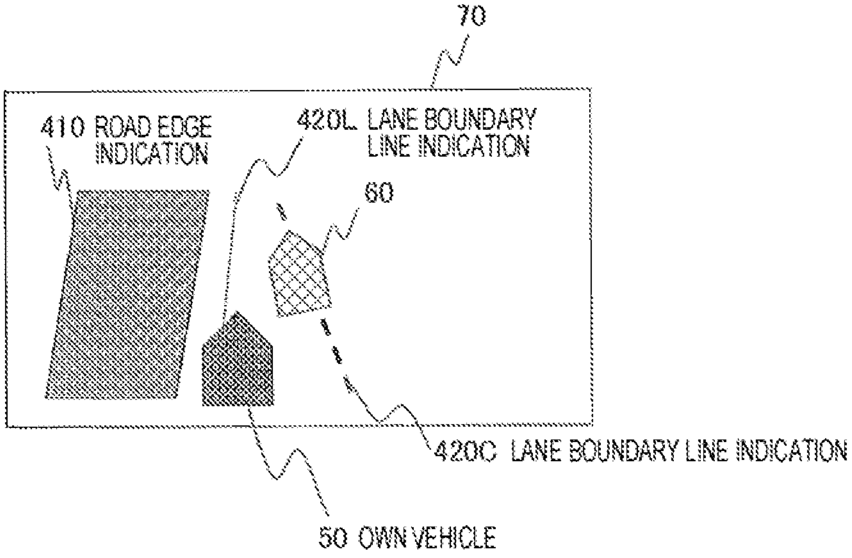
FIG. 7A is a diagram illustrating Example 1 of the present invention and illustrating an example of screen display of the HMI during the avoidance of the vehicle waiting to turn right.

FIG. 7A is a diagram illustrating an example of screen display of the HMI 22 when the vehicle is avoiding the vehicle 60 waiting to turn right.

Figure 7B:
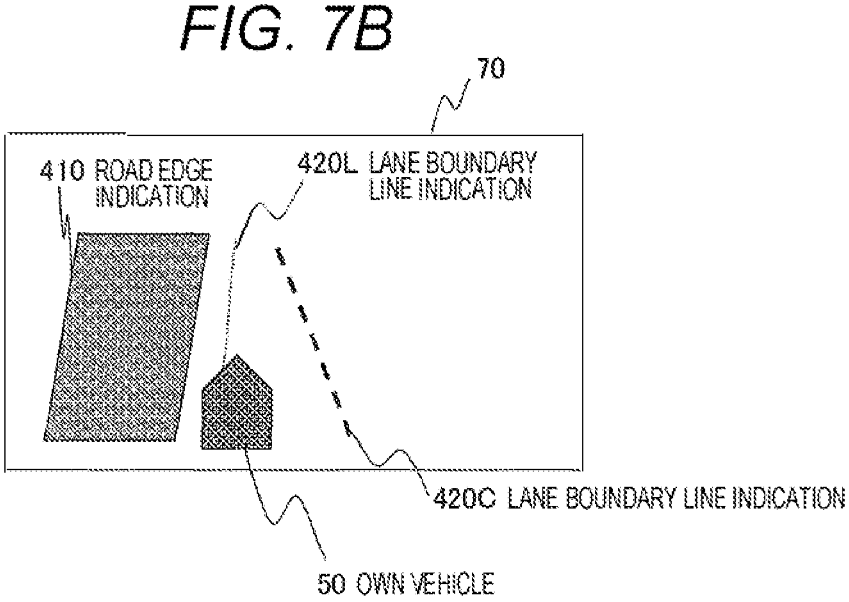
FIG. 7B is a diagram illustrating Example 1 of the present invention and illustrating an example of screen display of the HMI after the completion of the avoidance of the vehicle waiting to turn right.

FIG. 7B is a diagram illustrating an example of screen display of the HMI 22 after the completion of the avoidance of the vehicle 60 waiting to turn right.

FIGS. 7A and 7B both illustrate that the own vehicle 50 crosses the lane boundary line indication 420L while deviating from the lane to avoid an obstacle.

In the screen 70 of FIG. 7A, the obstacle (vehicle 60) is displayed because the avoidance of the obstacle has not been completed. The lane boundary line indication 420L on the road edge side is displayed light to notify that the lane deviation prevention alarm unit is suppressed.

On the screen 70 of FIG. 7B, the obstacle indication disappears when the obstacle (the vehicle 60) disappears or when the vehicle completely passes the side of the obstacle. When the own vehicle 50 is deviating from the lane, the lane boundary line indication 420L on the road edge 41 side is alternately displayed light and dark, and notifies that the alarm level of the lane deviation prevention alarm unit will eventually return to the original level.

When the vehicle travels a certain distance on the side of the obstacle or a certain time elapses, the driving assistance ECU 1 returns the alarm level of the lane deviation prevention alarm unit to the original level. In addition, when the driver returns to the inside of the lane by his/her driving operation, the alarm level of the lane deviation prevention alarm unit returns to the original level at the time of the return.

Figure 8:
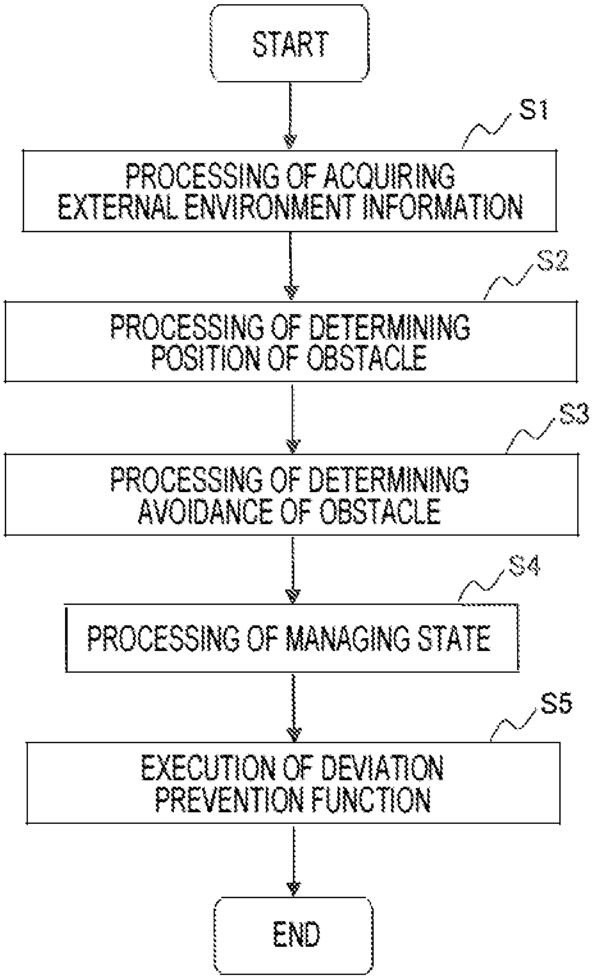
FIG. 8 is a flowchart illustrating Example 1 of the present invention and illustrating an example of a process of changing a lane deviation alarm setting.

FIG. 8 is a flowchart illustrating an example of processing of changing a setting of the deviation prevention alarm unit. This processing is executed at a predetermined cycle.

In processing of acquiring external environment information in step S1, the driving assistance system acquires image information from the camera 6, and the processing ECU 16 recognizes the lane boundary lines 42L and 42C, the road edge 41, and the obstacle (the vehicle 60), and converts them into predetermined coordinate information. The lane boundary lines 42L and 42C and the road edge 41 are held as a set of line segments each including two coordinate points on plane coordinates.

The obstacle is held as a polygon including a plurality of coordinate points on the plane coordinates. The depth of the obstacle may be difficult to predict from the image information, but is appropriately estimated from the size of the obstacle and the obstacle type information.

The driving assistance ECU 1 performs the above-described processing on all detected obstacles, and stores each obstacle in a list (obstacle list) (not illustrated). The obstacle list can hold up to 20 pieces of obstacle information.

Next, in step S2, the obstacle position determination unit 31 of the driving assistance ECU 1 determines the positional relationship between the road and the obstacle. On the plane coordinates divided into a plurality of regions based on the lane boundary lines 42L and 42C and the road edge 41, which region each coordinate point of the obstacle belongs to, distances between each coordinate point of the obstacle and the lane boundary lines 42L and 42C and the road edge 41, and distances between each coordinate point and the own vehicle 50 are calculated.

The obstacle position determination unit 31 adds, to the obstacle list, which region the detected obstacle is in, the distances between the obstacle and the lane boundary lines 42L and 42C and the road edge 41, and the distance between the own vehicle 50 and the obstacle.

Next, in step S3, the obstacle avoidance determination unit 32 of the driving assistance ECU 1 performs the following determination on each obstacle in the obstacle list.

(a) The obstacle is on the lane boundary lines 42L and 42C.

(b) The distance between the own vehicle 50 and the obstacle is N times or less of an estimated braking distance (distance uniquely determined based on the vehicle speed)

When both the conditions (a) and (b) are satisfied, the obstacle avoidance determination unit 32 determines that it is necessary to take a measure to avoid the obstacle or stop the vehicle. These are referred to as obstacles to be avoided.

Further, the obstacle avoidance determination unit 32 calculates a minimum value of a width W1 (see FIG. 3) between the obstacle and the lane boundary line 42L on the road edge 41 side, a minimum value of a width W2 (see FIG. 3) between the obstacle and the lane boundary line 42C on the road center side, a minimum value of the distance D1 (see FIG. 3) between the own vehicle 50 and the obstacle, and a maximum value of the distance D2 (see FIG. 3) between the own vehicle 50 and the deepest part of the obstacle among all the obstacles to be avoided.

Next, the obstacle avoidance determination unit 32 performs the following determination on each obstacle in the obstacle list.

(c) The obstacle is not on the lane boundary lines 42L and 42C but is on the road edge 41 (that is, it is on the shoulder (roadside zone)).

(d) The distance between the own vehicle 50 and the obstacle is within the maximum value of the distance between the own vehicle 50 and the deepest point of the obstacle to be avoided+the avoidance recovery distance (distance uniquely determined based on the vehicle speed).

When both of the conditions (c) and (d) are satisfied, the obstacle avoidance determination unit 32 determines that the obstacle needs to be handled when the own vehicle 50 performs avoidance driving using the roadside zone. These are referred to as road edge side obstacles.

The obstacle avoidance determination unit 32 calculates the minimum value of the width between the obstacle and the lane boundary line 42L on the road edge 41 side among all the road edge side obstacles.

Further, the obstacle avoidance determination unit 32 calculates the minimum value of the width between the lane boundary line 42C and the road edge 41 between the maximum value of the distance between the own vehicle 50 and the deepest part of the obstacle to be avoided+the avoidance recovery distance. Note that the avoidance recovery distance indicates a distance by which the own vehicle 50 returns to the original lane, and a value set in advance according to the vehicle speed can be used as the avoidance recovery distance.

Next, in step S4, the state management unit 33 of the driving assistance ECU 1 manages the state of the deviation prevention alarm unit.

FIG. 9 illustrates a state transition diagram of the deviation prevention alarm unit.

The deviation prevention alarm unit 34 managed by the state management unit 33 has three states, a normal state (S10), an avoidance state (S11), and a return state (S12), and changes the setting of the alarm level of the deviation alarm in each state. In addition, regarding the states of the deviation prevention alarm unit 34, the above-described three states are independently set for each of the lane deviation prevention alarm unit and the road edge deviation prevention unit. The state management unit 33 performs the following determination in order to determine the state transition.

(e) The minimum value of the width W1 (see FIG. 3) between the obstacle and the lane boundary line 42L on the road edge 41 side is less than or equal to a predetermined value Y1.

(f) The minimum value of the width W2 (see FIG. 3) between the obstacle and the lane boundary line 42C on the road center side is less than or equal to a predetermined value Y2.

In the case of (e) or (f), the state management unit 33 determines that the avoidance by changing the lane is necessary. Since the predetermined values Y1 and Y2 are set to be considerably smaller than the vehicle width of the own vehicle 50, this is a situation where the lane is almost impassable.

Next, the state management unit 33 performs the following determination.

(g) The minimum value of the width W1 between the obstacle and the lane boundary line 42L on the road edge 41 side is greater than or equal to the predetermined value Y1 and less than or equal to a predetermined value Y1*b*.

(h) The minimum value of the width W2 between the obstacle and the lane boundary line 42C on the road center side is greater than or equal to the predetermined value Y2 and less than or equal to a predetermined value Y2*b*.

In the case of (g) or (h), the state management unit 33 determines that the avoidance by deviation from the inside of the lane or from the lane is necessary. The predetermined values Y1*b* and Y2*b* are set substantially equal to the vehicle width of the own vehicle 50. In addition, the predetermined values Y1 and Y2 are set to about half the vehicle width of the own vehicle 50.

For this reason, in the case of the above condition (g) or (h), the own vehicle 50 is being closer to the road edge 41 side in the lane or being able to pass while deviating somewhat from the lane.

Next, the state management unit 33 performs the following determination.

(i) The sum of the minimum value of the width W1 between the obstacle to be avoided and the lane boundary line 42L on the road edge 41 side and the minimum value of the width between the obstacle (road edge obstacle) on the road edge 41 side and the lane boundary line 42L on the road edge 41 side is greater than or equal to a predetermined value Y3. Note that the predetermined value Y3 is a value equal to or larger than the vehicle width necessary for passing the side of the obstacle, and the value equal to or larger than the vehicle width can be changed according to the vehicle speed.

(j) The sum of the minimum value of the width W1 between the obstacle to be avoided and the lane boundary line 42L on the road edge 41 side and the minimum value of the width W3 (see FIG. 3) between the road edge 41 and the lane boundary line 42L on the road edge 41 side is greater than or equal to the predetermined value Y3.

In the case (i) or (j), the state management unit 33 determines that it is possible to avoid the obstacle by the deviation from the inside of the lane boundary line 42L or the lane boundary line 42L.

When it is determined by the above determination processing that the avoidance by the deviation from the inside of the traveling lane 40 or the traveling lane 40 is necessary and possible, the state management unit 33 changes the internal state of the deviation prevention alarm unit 34 from the normal state (S10) to the avoidance state (S11), and changes the setting of the deviation prevention alarm unit 34 as follows.

In step S5, the state management unit 33 changes the alarm level of the lane deviation prevention alarm unit related to the lane boundary line 42L on the road edge 41 side from large to small. The state management unit 33 performs a change such as reducing an alarm volume and a steering reaction force of the lane deviation prevention alarm unit, for example.

In addition, the state management unit 33 changes the content of the screen displayed by the HMI 22 in order to notify that the setting of the lane deviation prevention alarm unit has been relaxed.

In a determination result other than the above, the state management unit 33 causes the deviation prevention alarm unit to maintain the normal state, and to transition to a function OFF (S13) state when the driver operates a direction indicator or performs a braking operation.

The distance L1 (see FIG. 3) to the obstacle to be avoided becomes shorter as the own vehicle 50 moves forward. However, when the own vehicle 50 travels a distance equal to or longer than the total distance of the entire length of the own vehicle 50 and the depth of the obstacle to be avoided from the time when the own vehicle 50 starts to pass the side of the obstacle to be avoided, the driving assistance ECU 1 excludes the obstacle to be avoided from the objects to be avoided.

The driving assistance ECU 1 may determine that the avoidance of the obstacle to be avoided has been completed by detecting a side obstacle by sensors such as the sonar 8, the side camera 6, and the millimeter wave radar 7. In addition, the obstacle to be avoided may move by itself and be excluded from the objects to be avoided. When all the obstacles to be avoided are excluded from the objects to be avoided in this manner, the driving assistance ECU 1 changes the internal state from the avoidance state (S11) to the return state (S12), and the state management unit 33 changes the alarm level setting of the deviation prevention alarm unit as follows.

The state management unit 33 changes the alarm level of the lane deviation prevention alarm unit related to the lane boundary line 42L on the road edge 41 side from small to medium. For example, the state management unit 33 performs a change such as slightly increasing the alarm volume and the steering reaction force. In addition, the state management unit 33 performs display indicating that the lane deviation prevention alarm unit has transitioned to the return state (S12) on the screen displayed by the HMI 22.

Even in the return state (S12), the state management unit 33 constantly performs processing on the obstacle, and transitions to the avoidance state (S11) when a condition for transition from the normal state (S10) to the avoidance state (S11) is satisfied.

In the return state (S12), the state management unit 33 automatically transitions to the normal state (S10) after the lane deviation state is canceled by the driver's driving operation or the vehicle travels a return distance (predetermined distance) according to the vehicle speed, and changes the setting of the lane deviation prevention alarm unit to the normal state.

The state management unit 33 continues the deviation prevention alarm unit 34 after changing the state determination and the setting of the alarm level of the deviation prevention alarm unit.

As described above, when detecting an obstacle in front of the own vehicle 50, and determining that the vehicle can pass the side of the obstacle and avoid the obstacle in a case where the vehicle deviates from the lane boundary line 42L without deviating from the road edge 41, the driving assistance ECU 1 according to the present Example causes the lane deviation prevention alarm unit to transition from the normal state (S10) to the avoidance state (S11).

The lane deviation prevention alarm unit transitions to the avoidance state (S11) to reduce the alarm volume and the steering reaction force when the own vehicle 50 deviates from the lane boundary line 42L, thereby reducing the effect on the driver's driving operation.

Then, when the own vehicle 50 completes the passage of the side of the object to be avoided, the state management unit 33 changes the internal state of the lane deviation prevention alarm unit from the avoidance state (S11) to the return state (S12), and the state management unit 33 changes the alarm volume and the steering reaction force of the deviation prevention alarm unit from small to medium, and uses the display screen of the HMI 22 to notify that the lane deviation prevention alarm unit has transitioned to the return state (S12).

The state management unit 33 causes the lane deviation prevention alarm unit to transition to the normal state (S10) after the deviation state from the lane boundary line 42L is canceled by the driver's driving operation or the vehicle travels a return distance (predetermined distance) according to the vehicle speed, and returns the alarm volume and the steering reaction force to be large.

As described above, the driving assistance ECU 1 suppresses an alarm issued by the lane deviation prevention alarm unit when the vehicle passes the side of the obstacle, and can perform driving assistance without hindering the driving operation by the driver.

Example 2

Figure 13:
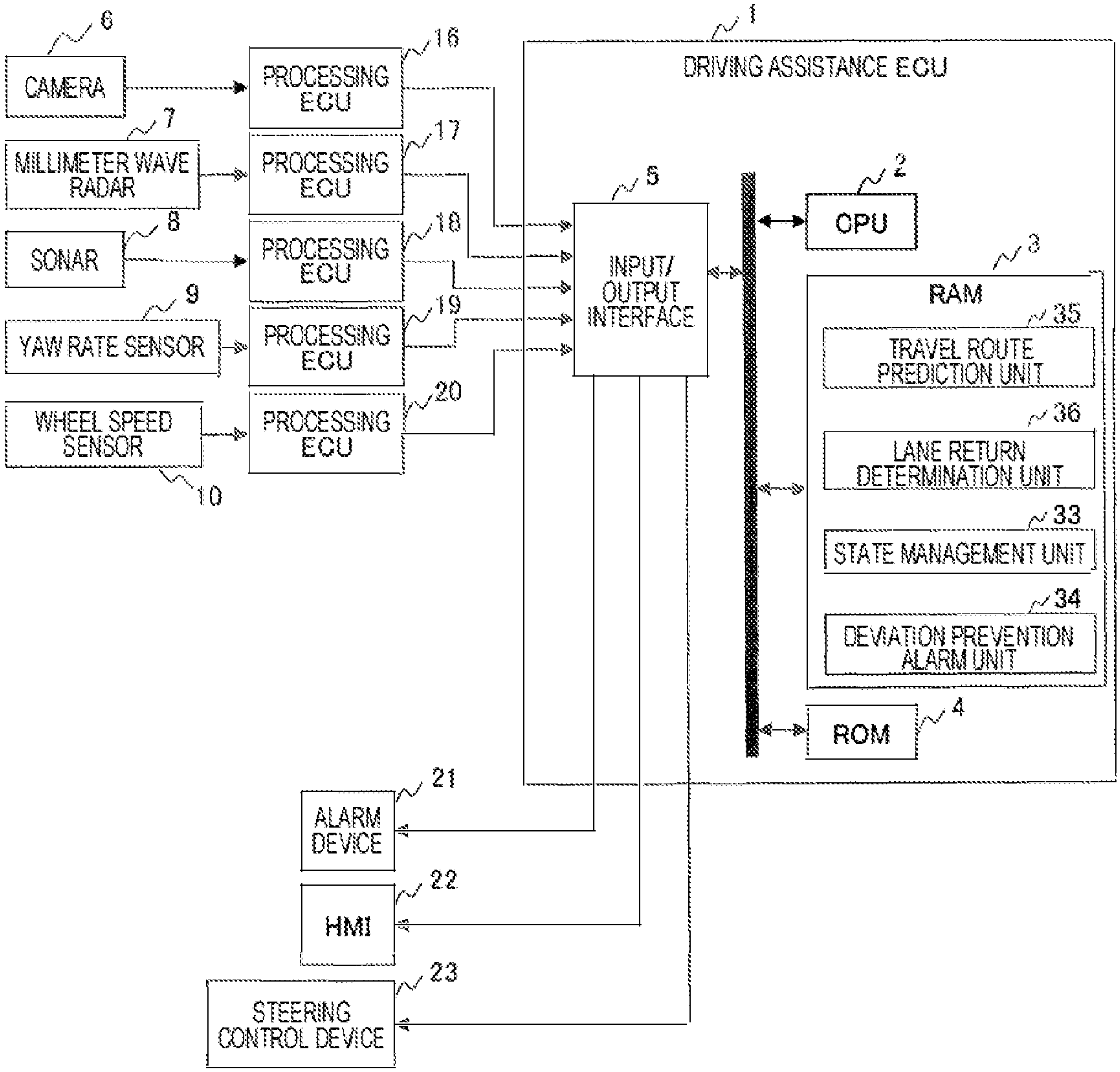
FIG. 13 is a block diagram illustrating Example 2 of the present invention and illustrating an example of a configuration of a driving assistance system.

Hereinafter, Example 2 of the present invention will be described with reference to the drawings. FIG. 13 is a block diagram illustrating an example of a configuration of a driving assistance ECU 1 according to Example 2.

The driving assistance ECU 1 according to Example 2 includes a travel route prediction unit 35 and a lane return determination unit 36 instead of the obstacle position determination unit 31 and the obstacle avoidance determination unit 32 of Example 1. Other configurations are similar to those of Example 1.

The travel route prediction unit 35 estimates a travel route from the current position of an own vehicle 50 to a predetermined distance (or after a predetermined time) on the basis of driving states such as a wheel speed and a steering angle, and calculates the estimated route as a predicted route 53.

As will be described later, when the own vehicle 50 deviates from the lane boundary line 42L on the predicted route 53 from the current position of the own vehicle 50 to the predetermined distance, the lane return determination unit 36 determines whether the own vehicle 50 that has traveled to the predetermined distance has returned into the traveling lane 40.

When it is estimated that the own vehicle 50 temporarily deviates from the lane boundary line 42L and then returns to the inside of the traveling lane 40 in a case where the own vehicle travels up to the predetermined distance, the lane return determination unit 36 instructs a state management unit 33 to suppress an alarm of a lane deviation prevention alarm unit.

Figure 11:
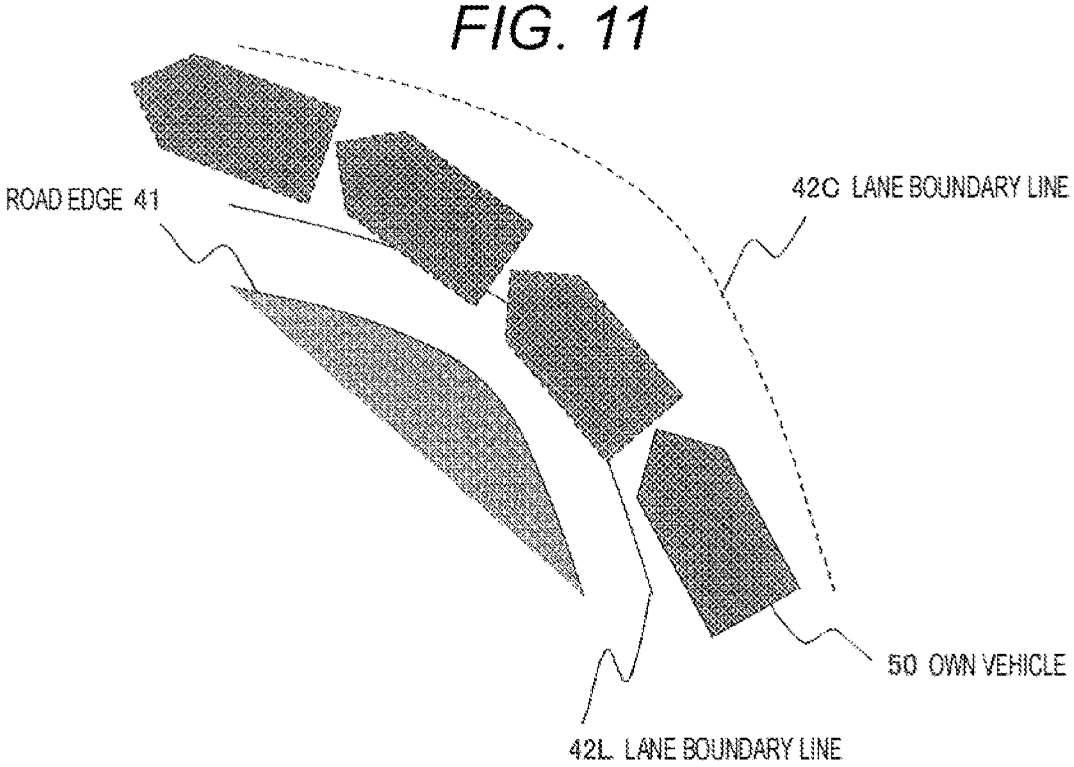
FIG. 11 is a diagram illustrating Example 2 of the present invention and illustrating that an own vehicle deviates inward from a boundary line while traveling on a curve.

FIG. 11 is a diagram illustrating that the own vehicle 50 deviates inward from the lane boundary line 42L on the road edge 41 side closer to the own vehicle 50 while traveling on a curve.

In this state, even when the own vehicle 50 temporarily deviates from the traveling lane, there is a high possibility that the own vehicle will immediately return to the inside of the traveling lane, and the risk of lane deviation is low. Therefore, when the driver performs a turning operation, assistance requested by the driver to a driving assistance function may be as follows.

(6) In the temporary lane deviation at the time of the turning, it is desirable to suppress a deviation prevention alarm for the lane boundary line 42L.

(7) When the vehicle approaches too close to the road edge 41, it is desirable to issue a deviation prevention alarm for the road edge 41.

Here, a deviation prevention alarm unit 34 of the driving assistance ECU 1 assists driving as follows.

(8) When detecting that the traveling lane in front is curved, the driving assistance ECU 1 changes the level of the deviation alarm for the lane boundary line 42L inside the curve in a lane deviation prevention alarm function.

(9) On the other hand, the driving assistance ECU 1 maintains a road edge deviation alarm function.

The driving assistance ECU 1 may detect the curve of the forward traveling lane by detecting that the lane boundary lines 42L and 42C are bent by the camera 6 that images the forward traveling lane, or may detect the forward curve from preset map information and position information of the own vehicle 50.

Further, as a driving assistance method of the deviation prevention alarm unit provided by the driving assistance ECU 1, the following is conceivable.

(k) The lane deviation from the lane boundary line 42L inside the turn of the own vehicle 50 is permitted.

(l) Although the temporal lane deviation from the lane boundary line 42L inside the turn is permitted, it can be predicted that the vehicle will recover from the lane deviation after traveling a predetermined distance.

(m) The lane deviation from the lane boundary line 42L inside the turn is permitted as long as the vehicle does not deviate from the road edge 41.

(n) The temporary lane deviation from the lane boundary line 42L inside the turn is permitted as long as the vehicle does not deviate from the road edge 41, but the recovery from the lane deviation after traveling the predetermined distance can be predicted.

The driving assistance ECU 1 determines whether or not the lane deviation from the lane boundary line 42L inside the turn is temporary as described later.

Figure 12:
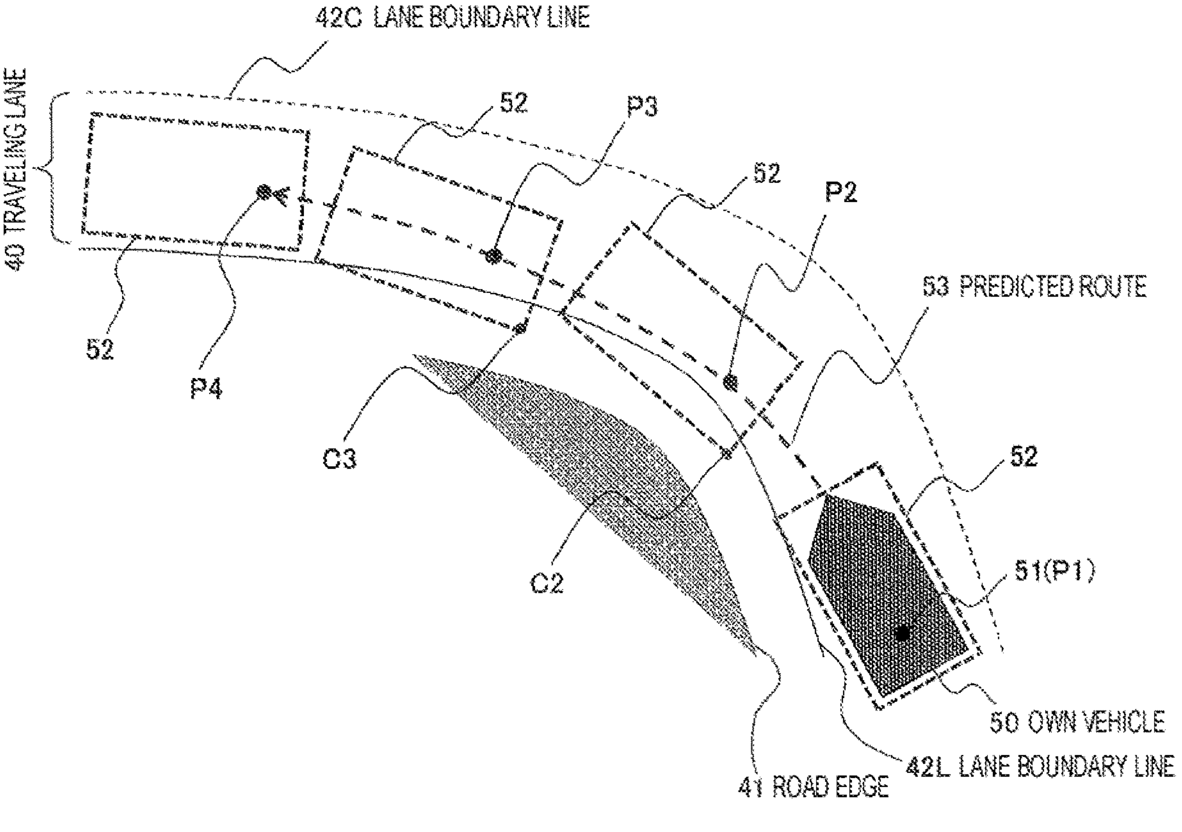
FIG. 12 is a diagram illustrating Example 2 of the present invention and explaining a method of determining a deviation prevention alarm while the own vehicle is traveling on a curve.

FIG. 12 is a diagram for describing a method of determining whether or not the lane deviation inside the turn during traveling of the own vehicle 50 on the curve is temporary.

The driving assistance ECU 1 calculates a predicted trajectory 54 of the own vehicle 50 to a predetermined distance (or after a predetermined time) from driving states such as a vehicle speed, a yaw rate, and a steering angle of the own vehicle 50, and in a case where a length of the predicted trajectory is L1, when an own vehicle rectangle 52 into which the own vehicle 50 completely enters does not lie on the lane boundary line 42L at the time of traveling the distance L1, the driving assistance ECU 1 suppresses issuing of the lane deviation prevention alarm unit even if the own vehicle rectangle 52 lies on the lane boundary line 42L in the distance L1 from the current position.

The driving assistance ECU 1 calculates a predicted route 53 from the current position P1 of the center 51 of the rear wheel axle of the own vehicle 50 to an estimated position P4 of the center 51 of the rear wheel axle after traveling a predetermined distance (for example, 100 m), and calculates estimated positions P2 and P3 of the center 51 of the rear wheel axle at predetermined distance intervals (or time intervals). A line connecting the current position P1 to the estimated position P4 is the predicted route 53.

The driving assistance ECU 1 calculates the own vehicle rectangle 52 at each of the estimated positions P2 to P4 from the current position P1, and issues an alarm by the road edge deviation prevention alarm unit when the own vehicle rectangle 52 approaches the road edge 41 at any of the estimated positions P2 to P4 from the current position P1.

Further, when the own vehicle rectangle 52 at the estimated position P4 is not on the lane boundary line 42L in the traveling lane 40, the state management unit 33 of the driving assistance ECU 1 suppresses the alarm by the lane deviation prevention alarm unit even when the own vehicle rectangle 52 at any one of the estimated positions P2 and P3 from the current position P1 is on the lane boundary line 42L.

As illustrated in FIG. 12, when the driving assistance ECU 1 makes the predicted route 53 of the center 51 of the rear wheel axle to the estimated position P4 where the own vehicle 50 has traveled a predetermined distance at the current position P1 where the own vehicle 50 is traveling on the curve, vertices C2 and C3 of the own vehicle rectangle 52 at the estimated positions P2 and P3 are located on the road edge 41 side of the lane boundary line 42L.

Since it is predicted that the own vehicle 50 returns into the traveling lane 40 when the own vehicle travels up to the predetermined distance L1 (P4), the state management unit 33 commands the deviation prevention alarm unit 34 to suppress the alarm of the lane deviation prevention alarm unit. As for the suppression of the alarm, the alarm volume and the steering reaction force are changed from large to small as in the above-described Example 1.

Then, after traveling up to the predetermined distance L1, the state management unit 33 returns the alarm of the lane deviation prevention alarm unit to the normal state.

The above control is an example, and the method is not limited to the above as long as the driving assistance ECU 1 can predict that the vehicle returns into the traveling lane 40 even when the vehicle temporarily deviates from the lane boundary line 42L on the road edge 41 side, and that the vehicle can avoid a collision with the road edge 41 and avoid going off the road edge 41.

In addition, regardless of the above conditions, the lane boundary line 42L for which the own vehicle rectangle 52 is determined to be inside the curve based on the degree of curvature of the lane boundary line 42L and the map information may be unconditionally set as an issuing suppression target. However, in this case, similarly to the above-described Example 1, it is necessary to perform state management by defining a state for suppressing issuing of an alarm.

As described above, in the driving assistance ECU 1 according to the present Example, even when the own vehicle 50 temporarily deviates from the traveling lane 40 toward the road edge 41 while traveling on the curve, the alarm of the lane deviation prevention alarm unit is suppressed when the predicted route after traveling a predetermined distance (or a predetermined time) returns into the traveling lane 40 without approaching the road edge 41.

As a result, it is possible to allow the driver to intentionally perform a driving operation of deviating from the lane boundary line 42L, and it is possible to improve the interest of driving while ensuring safety by driving assistance.

Note that, in the above description, an example has been described in which the same own vehicle rectangle 52 is used in a case where the lane deviation prevention alarm unit determines deviation from the lane boundary line 42L and a case where the road edge deviation prevention alarm unit determines deviation from the road edge 41. However, it is desirable to set the own vehicle rectangle 52 used for determination by the road edge deviation prevention alarm unit to be larger than the own vehicle rectangle 52 used for determination by the lane deviation prevention alarm unit. As a result, the driving assistance ECU 1 can issue an alarm when the own vehicle 50 approaches the road edge 41.

In addition, the size of the own vehicle rectangle 52 used for determination by the road edge deviation prevention alarm unit may be increased as the vehicle speed increases. When the shape of the road edge 41 can be acquired from the map information, the driving assistance ECU 1 can change the size of the own vehicle rectangle 52 used for determination by the road edge deviation prevention alarm unit according to the shape of the road edge 41.

Conclusion

As described above, the driving assistance ECUs 1 of the above-described Examples can have the following configuration.

(1) A driving assistance device (driving assistance ECU 1) that includes a processor (CPU 2) and a memory (RAM 3) and assists driving of a vehicle includes: an external environment information acquisition unit (camera 6) that acquires external environment information of the vehicle; an obstacle detection unit (obstacle position determination unit 31) that detects an obstacle (vehicle 60) in front of the vehicle from the external environment information; a lane detection unit (processing ECU 16) that detects a lane boundary line (42L) and a road edge (41) from the external environment information (6); an alarm unit (deviation prevention alarm unit 34) that issues an alarm or performs steering assist when deviation from the lane boundary line (42L) or the road edge (41) is detected; and a state management unit (33) that suppresses the alarm or steering assist by the alarm unit (34) when the obstacle detection unit (31) detects the obstacle (60).

With the above configuration, when an obstacle such as the vehicle 60 waiting to turn right is detected in front of the own vehicle 50, the driving assistance ECU 1 can suppress the alarm or steering assist by the deviation prevention alarm unit 34, thereby suppressing the prevention of the driver from intentionally deviating from the lane.

(2) In the driving assistance device according to (1), the alarm unit (34) includes: a lane deviation prevention alarm unit (34) that issues an alarm or performs steering assist in a case where the vehicle (50) deviates from the lane boundary line (42L); and a road edge (41) deviation prevention alarm unit (34) that issues an alarm or performs steering assist in a case where the vehicle deviates from the road edge (41).

With the above configuration, the driving assistance ECU 1 can independently control the deviation of the own vehicle 50 from the lane boundary line 42L and the deviation from the road edge 41.

(3) In the driving assistance device according to (2), when the obstacle (60) is detected, the state management unit (33) suppresses the alarm or steering assist of the lane deviation prevention alarm unit (34) and continues the road edge deviation prevention alarm unit (34).

With the above configuration, when an obstacle such as the vehicle 60 waiting to turn right is detected in front of the own vehicle 50, the driving assistance ECU 1 suppresses the alarm or steering assist by the lane deviation prevention alarm unit and continues the road edge deviation prevention alarm unit, thereby making it possible to suppress the prevention of the driver from intentionally deviating from the lane and prevent the deviation from the road edge 41.

(4) In the driving assistance device according to (2), the alarm unit (34) determines whether or not the obstacle (60) can be avoided based on a positional relationship between the obstacle (60), the lane boundary line (42L), and the road edge (41), and when the obstacle (60) can be avoided, the state management unit (33) suppresses the alarm or steering assist of the lane deviation prevention alarm unit (34) and continues the road edge (41) deviation prevention alarm unit (34).

With the above configuration, when an obstacle such as the vehicle 60 waiting to turn right can be avoided in front of the own vehicle 50, the driving assistance ECU 1 suppresses an alarm or steering assist by the lane deviation prevention alarm unit, and continues the road edge deviation prevention alarm unit, thereby making it possible to suppress prevention of the driver from intentionally deviating from the lane and prevent the vehicle from deviating from the road edge 41.

(5) In the driving assistance device according to (2), when the obstacle (60) is detected in a traveling lane divided by the lane boundary line (42L), the alarm unit (34) determines whether or not the obstacle (60) can be avoided by deviation from the lane boundary line (42L) on the road edge (41) side, and when the obstacle (60) can be avoided, the state management unit (33) suppresses the alarm or steering assist of the lane deviation prevention alarm unit (34) and continues the road edge (41) deviation prevention alarm unit (34).

With the above configuration, when it is possible to avoid an obstacle such as the vehicle 60 waiting to turn right in front of the own vehicle 50 by deviating from the lane boundary line 42L on the road edge 41 side, the driving assistance ECU 1 can suppress the prevention of the driver from intentionally deviating from the lane and prevent the vehicle from deviating from the road edge 41 by suppressing the alarm or steering assist by the lane deviation prevention alarm unit and by continuing the road edge deviation prevention alarm unit.

(6) The driving assistance device according to (1) further includes an interface (HMI 22) that displays a result of detecting the lane boundary line (42L) and the road edge (41).

With the above configuration, the driving assistance ECU 1 can display the detection states of the lane boundary line 42L and the road edge 41 on the HMI 22.

(7) The driving assistance device according to (2) further includes an interface (22) that displays suppression of the alarm or steering assist of the lane deviation prevention alarm unit (34).

With the above configuration, the driving assistance ECU 1 can display the suppression state of the alarm or steering assist of the lane deviation prevention alarm unit on the HMI 22.

(8) A driving assistance device that includes a processor (CPU 2) and a memory (RAM 3) and assists driving of a vehicle (50) includes: an external environment information acquisition unit (camera 6) that acquires external environment information of the vehicle (50); a lane detection unit (processing ECU 16) that detects a lane boundary line (42L) and a road edge (41) from the external environment information; a travel route prediction unit (35) that predicts a travel route of the vehicle and calculates a predicted route; a lane return determination unit (36) that determines that the predicted route (53) temporarily deviates from the lane boundary line (42L); an alarm unit (34) that issues an alarm or performs steering assist when deviation from the lane boundary line (42L) or the road edge (41) is detected; and a state management unit (33) that suppresses the alarm or steering assist by the alarm unit (34) when the lane return determination unit (36) determines a temporary deviation from the lane boundary line (42L).

With the above configuration, when the predicted route 53 of the own vehicle 50 temporarily deviates from the lane boundary line 42L, the driving assistance ECU 1 can suppress the alarm or steering assist by the deviation prevention alarm unit 34, thereby suppressing the prevention of the driver from intentionally deviating from the lane.

(9) In the driving assistance device according to (8), the alarm unit (34) includes a lane deviation prevention alarm unit (34) that issues an alarm or performs steering assist when the vehicle deviates from the lane boundary line (42L), and a road edge (41) deviation prevention alarm unit (34) that issues an alarm or performs steering assist when the vehicle deviates from the road edge (41).

With the above configuration, the driving assistance ECU 1 can independently control the deviation of the own vehicle 50 from the lane boundary line 42L and the deviation from the road edge 41.

(10) In the driving assistance device according to (9), the travel route prediction unit (35) calculates the predicted route (53) when a curve is detected in front of the vehicle (50), and the lane return determination unit (36) determines, as a temporary deviation from the lane boundary line (42L), that the vehicle inside a turn on the predicted route (53) returns to a traveling lane after deviating from the lane boundary line (42L).

With the above configuration, the driving assistance ECU 1 can detect the driver's intentional deviation from the lane boundary line 42L by determining, as a temporary deviation from the lane boundary line 42L, that the own vehicle 50 inside the turn deviates from the lane boundary line 42L on the predicted route 53 and then returns to the traveling lane 40.

(11) In the driving assistance device according to (9), when the temporary deviation from the lane boundary line (42L) is determined, the state management unit (33) suppresses the alarm or steering assist of the lane deviation prevention alarm unit (34) and continues the road edge deviation prevention alarm unit.

With the above configuration, when the driver's intentional deviation from the lane boundary line 42L is predicted, the driving assistance ECU 1 suppresses the alarm of the lane deviation prevention alarm unit and continues the road edge deviation prevention alarm unit, thereby preventing the deviation from the road edge without preventing the driver's intentional lane deviation.

Note that the present invention is not limited to the above-described Examples and includes various modifications.

For example, the above-described Examples have been described in detail for easy understanding of the present invention, and are not necessarily limited to those having all the described configurations. In addition, a part of the configuration of a certain Example can be replaced with the configuration of the other Example, and the configuration of a certain Example can be added to the configuration of the other Example. In addition, any of addition, deletion, and substitution of other configurations can be applied to a part of the configuration of each Example alone or in combination.

In addition, some or all of the above-described configurations, functions, processing units, processing means, and the like may be implemented by hardware, for example, by designing with an integrated circuit. In addition, each of the above-described configurations, functions, and the like may be implemented by software by a processor interpreting and executing a program for implementing each function. Information such as a program, a table, and a file for implementing each function can be stored in a recording device such as a memory, a hard disk, and a solid state drive (SSD), or a recording medium such as an IC card, an SD card, and a DVD.

In addition, the control lines and the information lines indicate lines considered to be necessary for the description, and not all the control lines and the information lines on the product are indicated. In practice, it may be considered that almost all the configurations are connected to each other.

The invention claimed is:

1. A driving assistance device that includes a processor and a memory and assists driving of a vehicle, the driving assistance device comprising:

- an external environment information acquisition unit that acquires external environment information of the vehicle;
- an obstacle detection unit that detects an obstacle in front of the vehicle from the external environment information;
- a lane detection unit that detects a lane boundary line and a road edge from the external environment information;
- an alarm unit that issues an alarm or performs steering assist when deviation from the lane boundary line or the road edge is detected; and
- a state management unit that suppresses the alarm or steering assist by the alarm unit when the obstacle detection unit detects the obstacle, wherein
  - the alarm unit includes:
    - a lane deviation prevention alarm unit that issues an alarm or performs steering assist in a case where the vehicle deviates from the lane boundary line,
    - a road edge deviation prevention alarm unit that issues an alarm or performs steering assist in a case where the vehicle deviates from the road edge or where there is a possibility that the vehicle may deviate from the road edge, and wherein
    - when the obstacle is detected, the state management unit suppresses the alarm or steering assist of the lane deviation prevention alarm unit, and
    - the road edge deviation prevention alarm unit determines deviation from the road edge using an own-vehicle rectangle having a size larger than an own-vehicle rectangle used by the lane deviation prevention alarm unit.

2. The driving assistance device according to claim 1, wherein

- the alarm unit determines whether or not the obstacle can be avoided based on a positional relationship between the obstacle, the lane boundary line, and the road edge, and
- when the obstacle can be avoided, the state management unit suppresses the alarm or steering assist of the lane deviation prevention alarm unit and continues the road edge deviation prevention alarm unit.

3. The driving assistance device according to claim 1, wherein

- when the obstacle is detected in a traveling lane divided by the lane boundary line, the alarm unit determines whether or not the obstacle can be avoided by deviation from a lane boundary line on the road edge side, and
- when the obstacle can be avoided, the state management unit suppresses the alarm or steering assist of the lane deviation prevention alarm unit and continues the road edge deviation prevention alarm unit.

4. The driving assistance device according to claim 1, further comprising an interface that displays a result of detecting the lane boundary line and the road edge.

5. The driving assistance device according to claim 1, further comprising an interface that displays suppression of the alarm or steering assist of the lane deviation prevention alarm unit.

6. A driving assistance device that includes a processor and a memory and assists driving of a vehicle, the driving assistance device comprising:

- an external environment information acquisition unit that acquires external environment information of the vehicle;
- a lane detection unit that detects a lane boundary line and a road edge from the external environment information;
- a travel route prediction unit that predicts a travel route of the vehicle and calculates a predicted route;
- a lane return determination unit that determines that the predicted route temporarily deviates from the lane boundary line;
- an alarm unit that issues an alarm or performs steering assist when deviation from the lane boundary line or the road edge is detected; and
- a state management unit that suppresses the alarm or steering assist by the alarm unit when the lane return determination unit determines a temporary deviation from the lane boundary line, wherein
  - the alarm unit includes:
    - a lane deviation prevention alarm unit that issues an alarm or performs steering assist in a case where the vehicle deviates from the lane boundary line, and
    - a road edge deviation prevention alarm unit that issues an alarm or performs steering assist in a case where the vehicle deviates from the road edge or where there is a possibility that the vehicle may deviate from the road edge, and wherein
    - when the temporary deviation from the lane boundary line is determined, the state management unit suppresses the alarm or steering assist of the lane deviation prevention alarm unit, and
    - the road edge deviation prevention alarm unit determines deviation from the road edge using an own-vehicle rectangle having a size larger than an own-vehicle rectangle used by the lane deviation prevention alarm unit.

7. The driving assistance device according to claim 6, wherein the travel route prediction unit calculates the predicted route when a curve is detected in front of the vehicle, and the lane return determination unit determines, as a temporary deviation from the lane boundary line, that the vehicle inside a turn on the predicted route returns to a traveling lane after deviating from the lane boundary line.

8. The driving assistance device according to claim 1, wherein while the alarm or steering assist of the lane deviation prevention alarm unit remains suppressed, actively continues performing certain activities, and the certain activities include: i) adjusting alarm volume or steering assist force, ii) maintaining other active alarm functions, and iii) monitoring predicted trajectory and managing transitions between states.

9. The driving assistance device according to claim 6, wherein while the alarm or steering assist of the lane deviation prevention alarm unit remains suppressed, actively continues performing certain activities, and the certain activities include: i) adjusting alarm volume or steering assist force, ii) maintaining other active alarm functions, and iii) monitoring predicted trajectory and managing transitions between states.

* * * * *